United States Patent
Certain et al.

(10) Patent No.: US 11,036,708 B2
(45) Date of Patent: Jun. 15, 2021

(54) INDEXES ON NON-MATERIALIZED VIEWS

(71) Applicant: Amazon Technologies, Inc., Seattle, WA (US)

(72) Inventors: Tate Andrew Certain, Seattle, WA (US); Yannis Papakonstantinou, La Jolla, CA (US); Allan Henry Vermeulen, Parksville (CA); Christopher Richard Jacques de Kadt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 27 days.

(21) Appl. No.: 16/200,600

(22) Filed: Nov. 26, 2018

(65) Prior Publication Data

US 2020/0167424 A1 May 28, 2020

(51) Int. Cl.
*G06F 16/22* (2019.01)
*G06F 16/18* (2019.01)
*G06F 16/2452* (2019.01)

(52) U.S. Cl.
CPC ...... *G06F 16/2282* (2019.01); *G06F 16/1815* (2019.01); *G06F 16/221* (2019.01); *G06F 16/2228* (2019.01); *G06F 16/24524* (2019.01)

(58) Field of Classification Search
CPC ..................................................... G06F 16/22
USPC ........................................ 707/717, 756, 769
See application file for complete search history.

(56) References Cited

U.S. PATENT DOCUMENTS

| | | | |
|---|---|---|---|
| 4,309,569 A | 1/1982 | Merkle | |
| 4,897,842 A | 1/1990 | Herz et al. | |
| 8,914,404 B1 * | 12/2014 | Kim | G06F 16/2358 707/769 |
| 9,043,355 B1 | 5/2015 | Kapoor et al. | |
| 9,509,652 B2 | 11/2016 | Ahn et al. | |
| 2002/0010701 A1 * | 1/2002 | Kosciuszko | G06F 16/22 |
| 2006/0047713 A1 | 3/2006 | Gornshtein et al. | |
| 2010/0049715 A1 | 2/2010 | Jacobsen et al. | |
| 2011/0055201 A1 | 3/2011 | Burger | |
| 2015/0081623 A1 | 3/2015 | Promhouse et al. | |
| 2017/0048339 A1 | 2/2017 | Straub | |

(Continued)

FOREIGN PATENT DOCUMENTS

| | | |
|---|---|---|
| EP | 818743 A2 | 1/1998 |
| EP | 1164510 A2 | 12/2001 |
| WO | 2015187187 A1 | 12/2015 |

OTHER PUBLICATIONS

Haber et al., "How to Time-Stamp a Digital Document," The Journal of Cryptology 3(2):99-111, Jan. 1991.

(Continued)

*Primary Examiner* — Baoquoc N To
(74) *Attorney, Agent, or Firm* — Davis Wright Tremaine LLP

(57) ABSTRACT

A database management system receives a request to create an index for a virtual view of a database table. In response to the request, the database management system identifies relationships between the columns of the virtual view and columns of the database table. The database management system generates an index on the database table, where columns are included in the generated index based on the identified relationships and the definition of the virtual view. Queries of the virtual view are assisted by the generated index of the underlying table.

20 Claims, 12 Drawing Sheets

(56) References Cited

U.S. PATENT DOCUMENTS

| | | |
|---|---|---|
| 2017/0075902 A1 | 3/2017 | Hoffner et al. |
| 2017/0134260 A1 | 5/2017 | Davidson |
| 2017/0250815 A1 | 8/2017 | Cuende et al. |
| 2017/0272250 A1 | 9/2017 | Kaliski, Jr. |
| 2017/0301047 A1 | 10/2017 | Brown et al. |
| 2018/0075080 A1 | 3/2018 | Hann et al. |
| 2018/0089041 A1 | 3/2018 | Smith et al. |
| 2018/0129711 A1 | 5/2018 | Richardson |
| 2018/0330349 A1 | 11/2018 | Uhr et al. |
| 2018/0331832 A1 | 11/2018 | Pulsifer |
| 2019/0004789 A1 | 1/2019 | Mills |
| 2019/0004974 A1 | 1/2019 | Chhabra et al. |
| 2019/0087600 A1 | 3/2019 | Sion et al. |
| 2019/0182047 A1 | 6/2019 | Andreina et al. |
| 2020/0007581 A1 | 1/2020 | Vouk et al. |
| 2020/0052884 A1 | 2/2020 | Tong et al. |
| 2020/0169412 A1 | 5/2020 | Certain et al. |

OTHER PUBLICATIONS

Oberhaus, "Radioactive Material From Chernobyl Will Help Secure the Next Version of Zcash: How to use toxic waste to generate 'toxic waste,'" Feb. 14, 2018, retrieved Nov. 8, 2019 from https://www.vice.com/en_us/article/gy8yn7/power-tau-zcash-radioactive-toxic-waste, 5 pages.

Oberhaus, "The World's Oldest Blockchain Has Been Hiding in the New York Times Since 1995: This really gives a new meaning to the 'paper of record,'" Apr. 27, 2018, retrieved Nov. 7, 2019 from https://www.vice.com/en_us/article/j5nzx4/what-was-the-first-blockchain, 5 pages.

Oberhaus, "Watch This Hilarious Bitcoin Explainer Generated by an AI: Botnik strikes again with a short Bitcoin explainer made by a predictive text AI that was trained on other Bitcoin explainers," May 23, 2018, retrieved Nov. 7 from https://www.vice.com/en_us/article/xwmy9a/watch-botnik-ai-bitcoin-explainer, 4 pages.

Okrent, "The Public Editor; Paper of Record? No Way, No Reason, No Thanks," Apr. 25, 2004, retrieved Nov. 8, 2019 from https://www.nytimes.com/2004/04/25/weekinreview/the-public-editor-paper-of-record-no-way-no-reason-no-thanks.html, 4 pages.

Whitaker, "The Eureka Moment That Made Bitcoin Possible: A key insight for the technology came to a physicist almost three decades ago at a Friendly's restaurant in New Jersey," May 25, 2018, retrieved Nov. 8, 2019 from https://www/wsj.com/articles/the-eureka-moment-that-made-bitcoin-possible-1527268025, 4 pages.

U.S. Appl. No. 16/200,595, filed Nov. 26, 2018.
U.S. Appl. No. 16/200,584, filed Nov. 26, 2018.
U.S. Appl. No. 16/200,589, filed Nov. 26, 2018.
U.S. Appl. No. 16/356,868, filed Mar. 18, 2018.

Plattner, "A Common Database Approach for OLTP and OLAP Using an In-Memory Column Database," Proceedings of the 2009 ACM SIGMOD International Conference on Management of Data (SIGMOD '09), Jun. 29, 2009, 7 pages.

International Search Report and Written Opinion dated Feb. 26, 2020, in International Patent Application No. PCT/US2019/063103, filed Nov. 25, 2019.

International Search Report and Written Opinion, dated Feb. 21, 2020, in International Patent Application No. PCT/US2019/063058, filed Nov. 25, 2019.

Wikipedia, "Merkle tree," Oct. 30, 2018, retrieved Feb. 11, 2020, from https://en.wikipedia.org/w/index.php?title=Merkle tree&oldid=866395282, 5 pages.

\* cited by examiner

INDEXES ON NON-MATERIALIZED VIEWS

BACKGROUND

Database management systems provide facilities to store and retrieve data. Although a wide variety of database management systems exists, the most popular may be divided into one of two categories. The first category of databases, relational databases, are those built on the relational model and generally supporting tables of fixed-length records. The second category is non-relational databases, which may substitute the comparatively rigid structured query language ("SQL") with other query mechanisms. Databases of both of these categories are widely used. However, database management systems in both categories have their own respective limitations.

BRIEF DESCRIPTION OF THE DRAWINGS

Various techniques will be described with reference to the drawings, in which.

DETAILED DESCRIPTION

Figure 1:
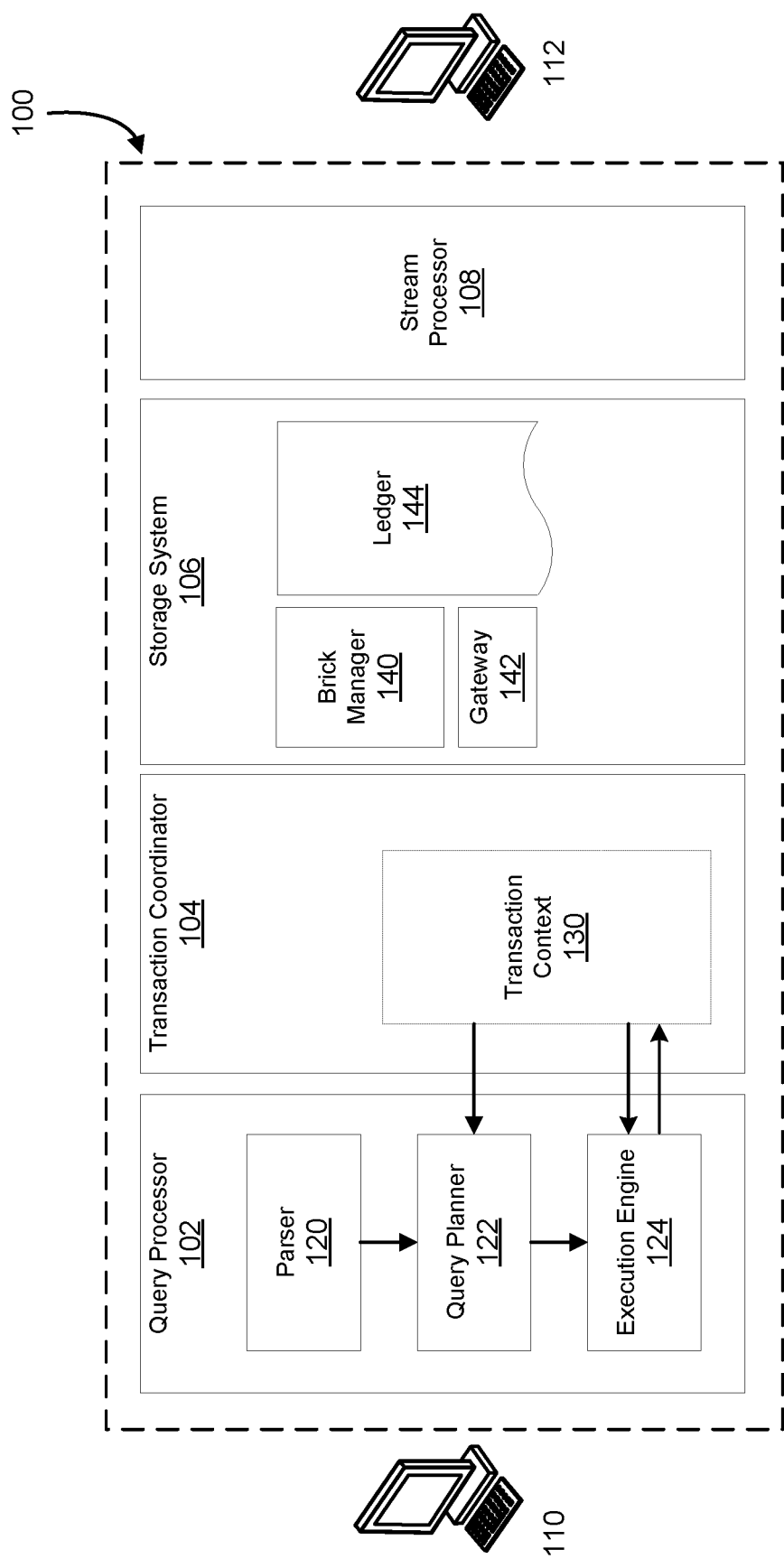
FIG. 1 illustrates a ledger-based database system, in accordance with an embodiment.

Described herein are systems and techniques related to the operation of a database management system. In various embodiments, the database is ledger-based. A ledger, as used herein, comprises journal and summary data structures adapted for use in a database management system. A journal records an immutable history of transactions performed on a document managed by the system, and a summary provides a synopsis of the document's current state.

In an example embodiment, an aspect of the ledger-based database involves non-materialized views, and in particular various techniques for improving the operation and performance of a non-materialized view. A non-materialized view, which may sometimes be referred to as a virtual view, is a view that is defined but for which no results are stored. For example, a view might be defined as containing the results of a query language statement. However, for a virtual view, the results of this query are not stored a priori, but rather executed as needed whenever the virtual view is queried. A disadvantage of non-materialized views is that they are less performant that materialized views, since the results of the query which define the view is re-executed every time the view is queried.

There may be times, however, where an administrator or client of the database wishes for performance of a virtual view to be improved. With a materialized view, the administrator or client might request that an index be created for the view. However, with a non-materialized or virtual view, there is no data to index since the view is not materialized. However, embodiments described herein may receive a request to create an index on a virtual view, and process the request by creating a similar index which includes references to columns of the table that underlies the virtual view. The index on the virtual view is created such that its effect on the performance of the query is similar, though not in all cases identical, to the effect that the requested index would have if created on a materialized view.

In an example, a database management system receives a request to create an index of a virtual view of a database table. In response to the request, the database identifies relationships between the columns of the requested virtual view and the columns of a database table on which the virtual view is based. The system then generates an index of the virtual view, in which references to columns of the database table are included in the index based on the identified relationships. After creating the index, the database processes queries directed to the virtual view based at least in part on the generated index.

In another example, a ledger-based database management system stores data for a table as a journal of transactions. The journal of transactions includes records which describe each and every change applied to documents stored in the table. In order to access this data, users may query a journal table. It may be desired to create views on a journal table, but various design considerations may preclude materializing such views. However, performance optimizations may be achieved by creating indexes on the underlying data, using the techniques described herein.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following. Embodiments are capable improving the performance and efficiency of queries of virtual views. Embodiments may also improve performance of virtual views created of journal tables.

FIG. 1 illustrates a ledger-based database system, in accordance with an embodiment. The example ledger-based database system 100 comprises a query processor 102, transaction coordinator 104, storage system 106, and stream processor 108.

A client device 110 may send queries to the database system 100. Here, a query refers to a request for information to be retrieved by the database system 100, expressed in accordance with a query language definition and a schema. For example, a query might be expressed in structured query language ("SQL"), or a variant thereof, and might further conform to the schema of a table referenced by the query.

Schema refers to the names and structure of a table or other element, such as a view or index. A query that conforms to a schema refers to names and structures consistent with the schema. For example, the projection clause of a query may generally refer only to columns of a table that exist in the corresponding schema, except for special circumstances such as projection columns that are defined by the query itself.

A client device 112 may also access stream functions of the distributed database system 100. Alternatively, various hosted services may access stream functions. Here, stream functions refers to features of the distributed database that relate to direct and/or immediate access to a stream of transactions processed by, about to be processed by, or being processed by, the database system 100.

In an embodiment, a query processor 102 comprises a module operative on a computing device comprising at least one processor and a memory. As used herein, a module or sub-module refers to a portion of the memory in which processor-executable instructions are stored, where the instructions, when executed by the processor, cause the computing device to perform the functions attributed to the module. The query processor 102 performs functions related to processing queries received from the client device 110. The query processor 102 may comprise a parser 120, query planner 122, and execution engine 124. The database system 100 may comprise a fleet of query processors similar to the query processor 102 depicted in FIG. 1, to facilitate scaling.

In an embodiment, the parser 120 performs lexical and semantic analysis of a received query. This may include converting textual components of the received query to non-textual data structures, such as abstract syntax trees. It may further involve determining whether the query is syntactically valid, and valid with respect to any relevant schemas.

In an embodiment, the query planner 122 determines a plan for executing the received query. This may involve identifying various approaches to executing the query, estimating the costs of the various approaches, and selecting a plan believed by the query planner 122 to be most optimal. The query planner 122 may rely on various statistics, some of which may be provided by the storage system 106, regarding the amounts of relevant data stored by the storage system 106, how long it might take to scan or retrieve the relevant data, and so forth.

In an embodiment, the execution engine 124 obtains a plan for executing the query from the query planner 122, and executes the plan. Executing the plan may generally involve initiating scanning and retrieval of data, and assembling the results of the query. The execution engine, for example, may process a query by initiating a scan of a summary table or journal, or initiating some other operation, in order to retrieve data relevant to the query. The scanning and retrieval is performed by the storage system 106. The execution engine, in cases and embodiments, assembles the results of the query by performing join operations, filtering operations, and so on. The execution engine also applies a projection, as reflected in the original query and in the query plan. This step ensures that the assembled results conform to the expected schema.

In an embodiment, a transaction coordinator 104 comprises a module operative on a computing device comprising at least one processor and a memory. The transaction coordinator 104 can be co-located on a computing device with other modules, such as the query processor 102, or it may be located on a separate computing device. The database system 100 may comprise a fleet of transaction coordinators similar to the transaction coordinator 104 depicted in FIG. 1, to facilitate scaling.

The transaction coordinator manages query execution and command execution, to implement transactional properties such as atomicity, consistency, isolation, and durability. These are sometimes referred to as "ACID" properties. The transaction coordinator 104 communicates with the query processor 102 and storage system 106 to ensure that queries and command intended to be performed in a transaction context 130, are executed according to desired levels of ACID conformance.

In an embodiment, a storage system 106 comprises a module operative on a computing device comprising at least one processor and a memory. The storage system 106 can be co-located on a computing device with other modules, or located on a separate computing device. The database system 100 may comprise a fleet of storage systems similar to the storage system 106 depicted in FIG. 1, to facilitate scaling. The storage system 106 may comprise various sub-modules, including a brick manager 140, gateway 142, and ledger 144. Further aspects of these components of the storage system 106 are described herein. In general, the storage system 106 is responsible for performing storage and retrieval operations on the ledger 144.

In an embodiment, a stream processor 108 comprises a module operative on a computing device comprising at least one processor and a memory. The stream processor 108 can be co-located on a computing device with other modules, or located on a separate computing device. The database system 100 may comprise a fleet of stream processors similar to the stream processor 108 depicted in FIG. 1, to facilitate scaling. The stream processor 108 provides direct or immediate access to a stream of transactions processed by, about to be processed by, or being processed by, the database system 100. Various client devices and hosted client applications, such as the depicted client device 112, may access the stream of transactions and respond to the transactions as they occur.

Figure 2:
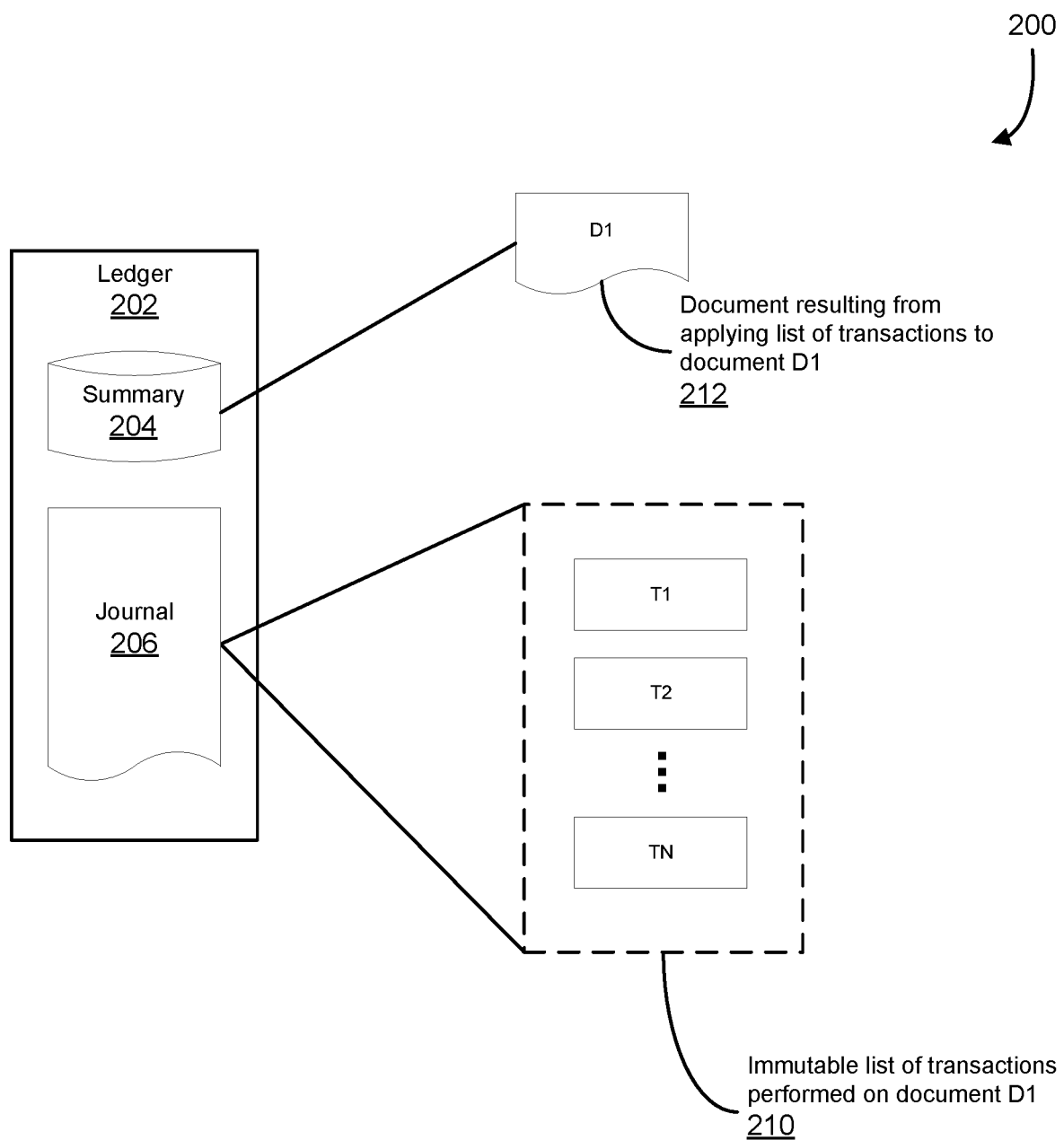
FIG. 2 illustrates distributed storage of a ledger used in conjunction with a ledger-based database system, in accordance with an embodiment.

The database system 100 of FIG. 1 is described as being ledger-based because it uses a ledger as its underlying storage structure. FIG. 2 illustrates distributed storage of a ledger used in conjunction with a ledger-based database system, in accordance with an embodiment. The ledger 202 of FIG. 2 may therefore correspond to the ledger 144 that FIG. 1 depicts.

The principal components of a ledger are one or more journals of immutable transactions, and a summary that reflects the results of those transactions. As depicted in the example 200 of FIG. 2, a ledger 202 comprises a journal 206 and a summary 204. The ledger 202 of FIG. 2 corresponds to the ledger 144 of FIG. 1.

The ledger 202 comprises a list of immutable transactions applied to documents or other data maintained by the distributed database 100. For example, the ledger 202 might comprises a list 210 of transactions performed on a document D1. The transactions are considered immutable because, once entered into the journal 206, they are neither changed nor deleted. The journal 206, in various embodiments, thus contains a complete and verifiable history of all changes made to the document D1.

The ledger 202 further comprises a summary 204. The summary 204 reflects the contents or state of each document stored in the database after applying all of the committed transactions, in order. For example, the summary 204 might contain the document 212 resulting from applying the list 210 of transactions applied to the document D1.

In various embodiments, the database system 100 supports queries of tables and views, and the use of indexes, in a manner that at least appears to the user to be similar to that of traditional relational database management systems. The database system 100, in various embodiments, provides a session-based transactional application programming interface ("API"). Through the interface, using a superset of SQL, client devices may interact with documents, tables, views, and indexes, despite the difference in the underlying storage structures.

Figure 3:
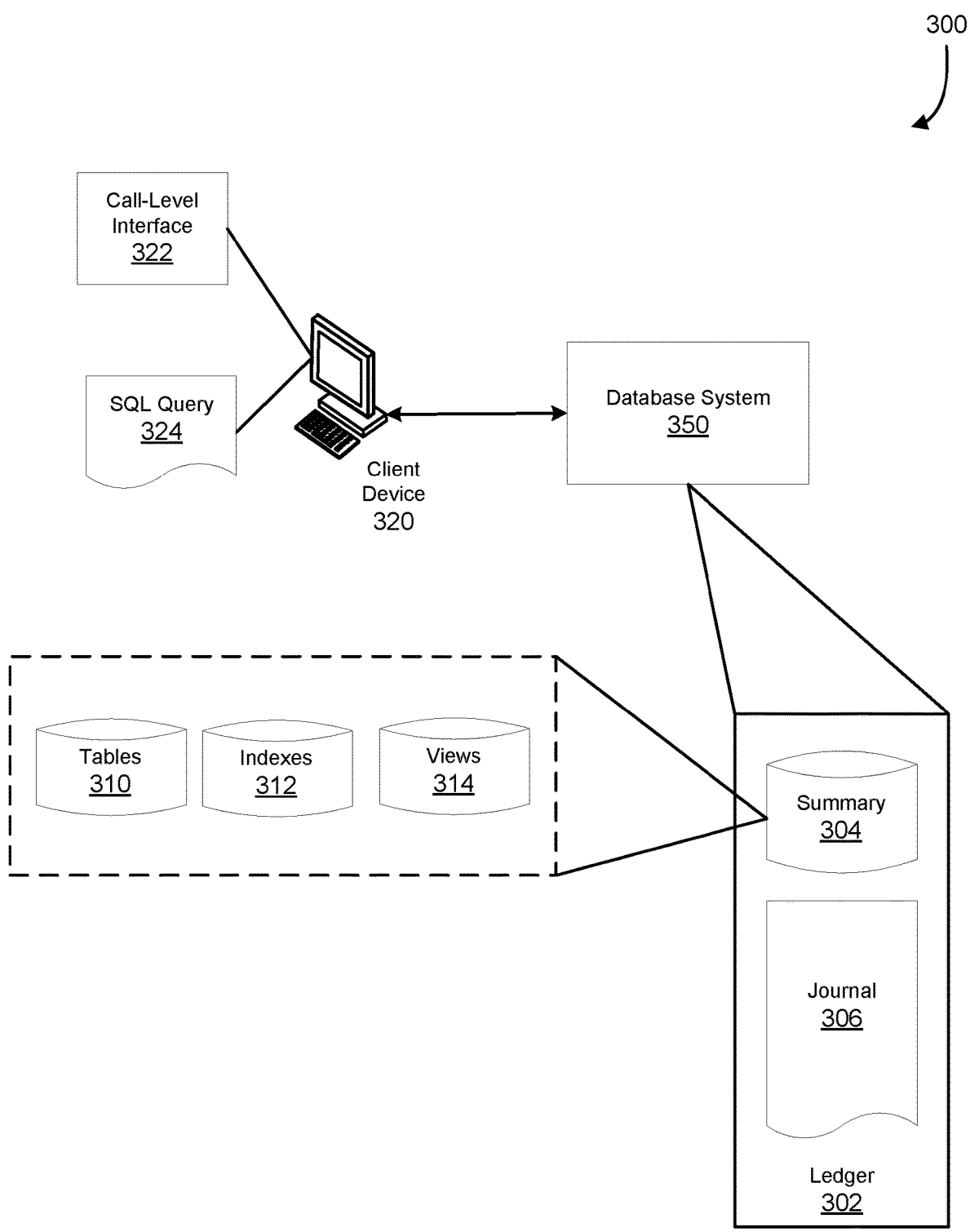
FIG. 3 illustrates aspects of query processing in a ledger-based database system, in accordance with an embodiment.

FIG. 3 illustrates aspects of query processing in a ledger-based database system, in accordance with an embodiment. In the example 300 of FIG. 3, the ledger 302, summary 304, and journal 306 may correspond to the ledger, summary, and journal depicted in FIG. 2.

In various embodiment, a client device 320, or more generally a client process, sends a SQL query 324 to a database system 350, using a call-level interface 322. The database system 350 depicted in FIG. 3 may correspond to the database system 100 depicted in FIG. 1. The call-level interface 322 can be an API for interacting with a database system, such as various available connectivity interfaces. The SQL queries 324 can be queries expressed in SQL, or a superset or subset thereof. Note, however, that the use of SQL in this example should not be construed so as to limit the scope of the present disclosure to embodiments which use SQL. Embodiments may use any of a wide variety of query languages.

The summary 304 stores data that represents the current state of the ledger's tables 310, indexes 312, and views 314. Aspects of storage techniques for the summary data are described below, regarding FIG. 7.

A query, such as the SQL query 324, can be processed in view of the data contained in the summary 304. For example, a query execution plan might rely on current data stored in the summary, such as index data, to efficiently execute a query. The query execution plan might further rely on current values for elements of a document when applying a projection.

Figure 4:
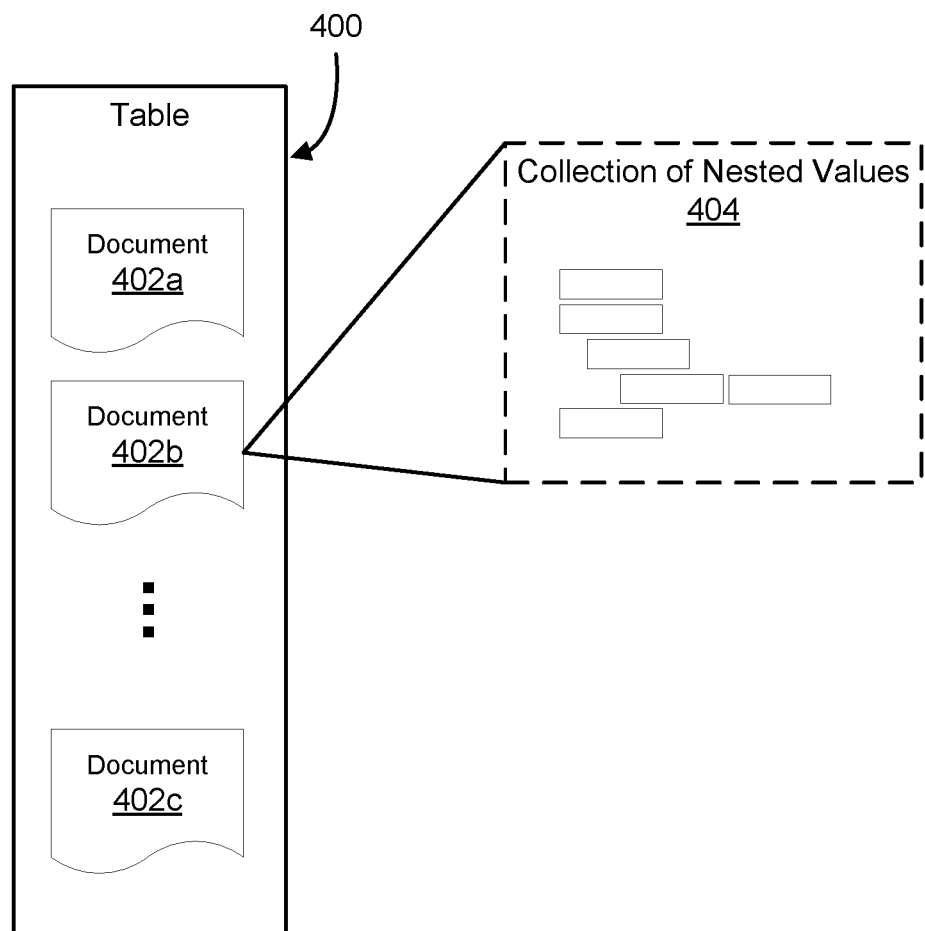
FIG. 4 illustrates a table structure of a ledger-based database system, in accordance with an embodiment.

The tables of the database system 100 are logically organized as collections of documents. FIG. 4 illustrates a table of a ledger-based database system, in accordance with an embodiment. As depicted by FIG. 4, a table 400 comprises a collection of documents 402a-c. A document 402 might also be described as a row of the table. However, in various embodiments, each document can comprise a collection of nested values 404. Accordingly, embodiments may support more loosely structured data than what is typically supported by conventional database management systems.

The example table 400 may generally be treated as a logical entity exposed to a client device via a query language, rather than a physical data storage structure. As described herein, the data for the table 400 is stored using a ledger comprising journal and summary portions.

Figure 5:
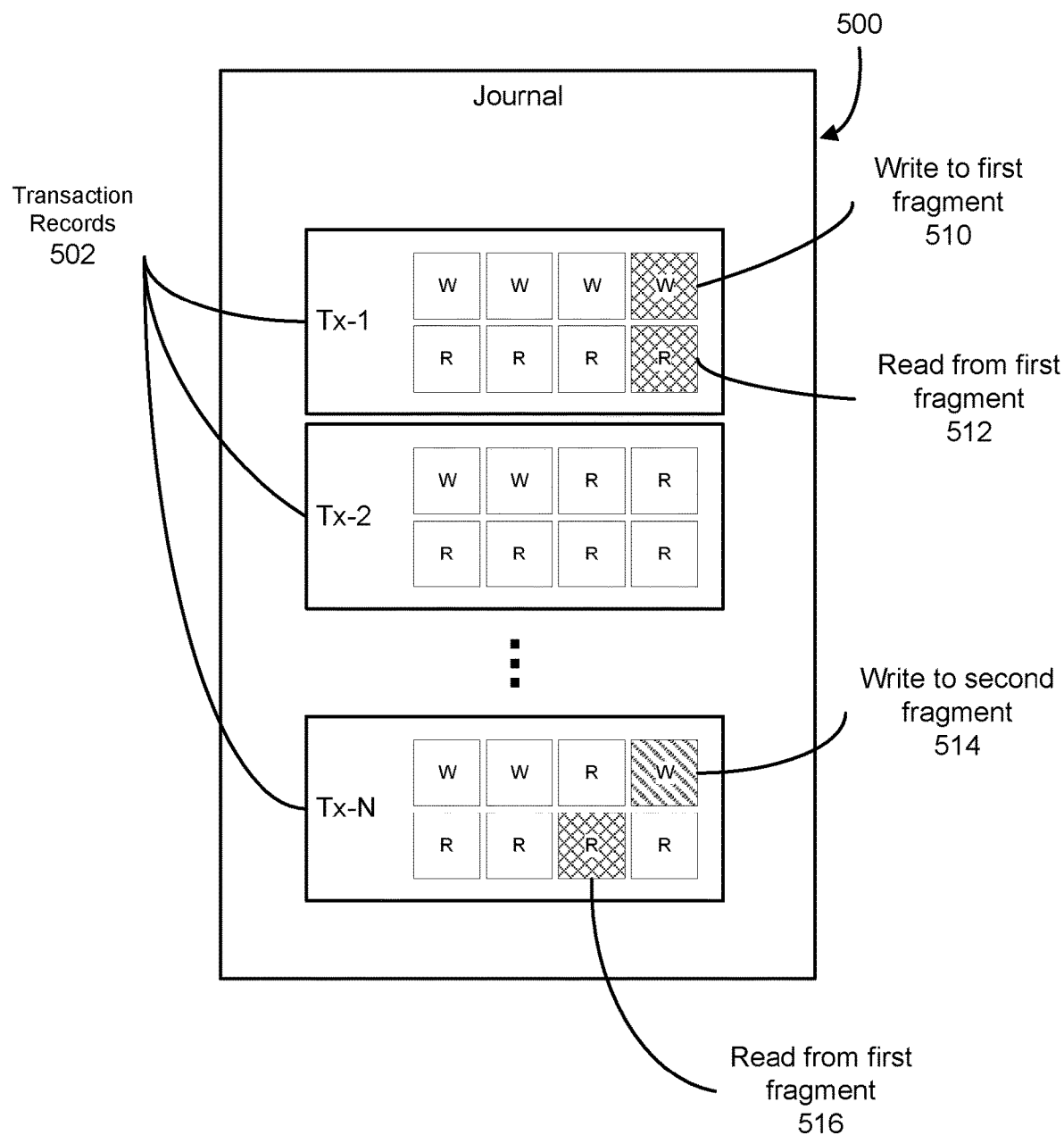
FIG. 5 illustrates a journal, in accordance with an embodiment.

FIG. 5 illustrates a journal, in accordance with an embodiment. In the example of FIG. 5, a journal 500 comprises an immutable, append-only list of transaction records 502. Each of the transaction records 502 comprises data indicative of a read or write operation to a document. There is at least one such chain, or sequence, of transactions for every document represented in the journal 500.

In an embodiment, such as the embodiment depicted in FIG. 5, the transaction records comprise data indicative of a data fragment associated with the read or write operation. For example, in FIG. 5, data is stored indicating that Tx-1 comprises a write to a first fragment 510 and a read from the first fragment 512. Likewise, transaction Tx-N comprises a write to a second fragment 514 and a read from the first fragment 516.

Figure 7:
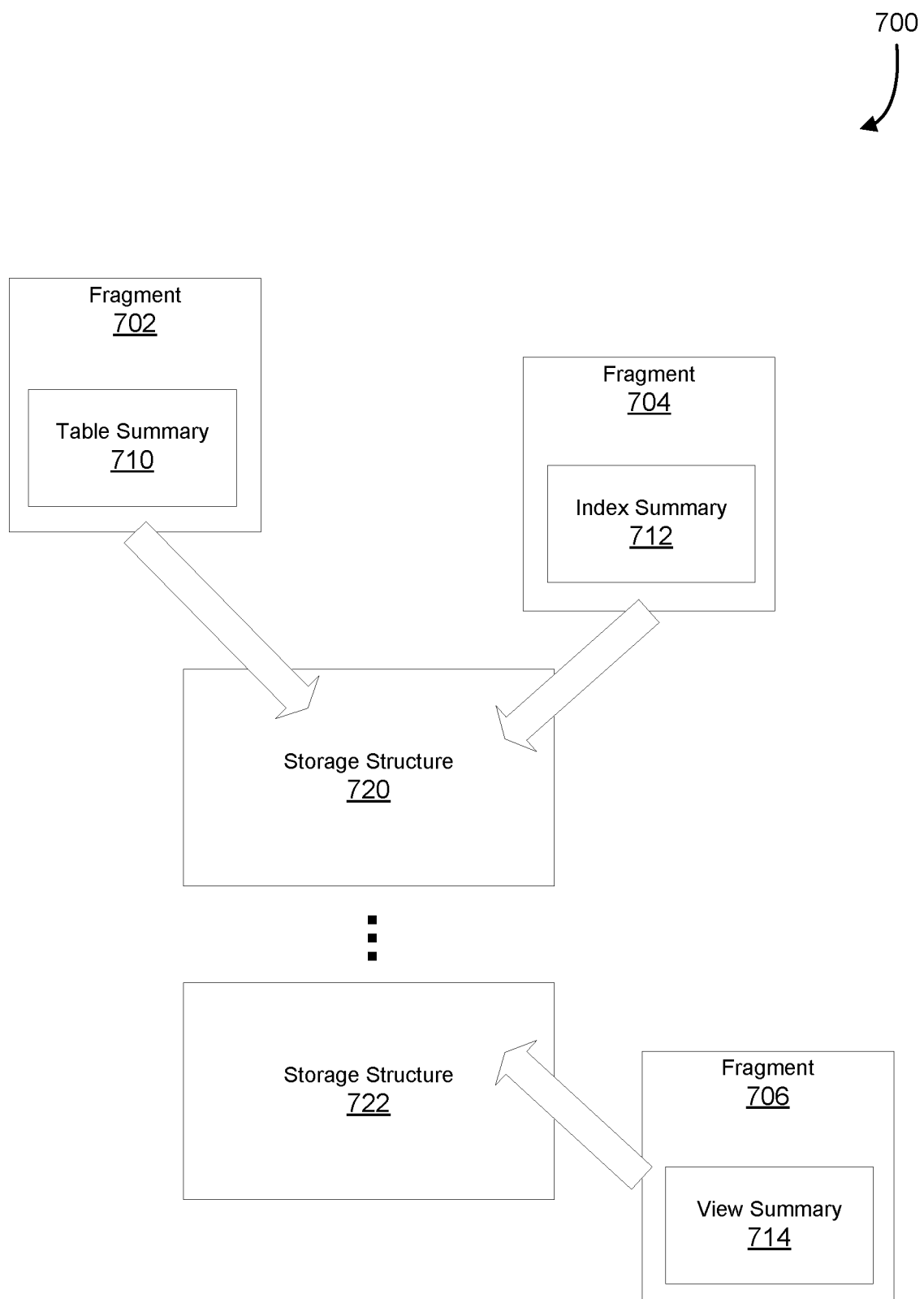
FIG. 7 illustrates aspects of a storage technique for summary data, in accordance with an embodiment.

More generally, the journal 500 comprises transaction records 502 which comprise data indicative of changes made both to a logical document and to the underlying storage structure for the journal. FIG. 7 describes aspects of the storage structure.

As depicted in FIG. 5, entries in the journal 500 are stored to reflect an immutable order, in the same sequence as the transactions were applied. For example, Tx-N represents the oldest transaction, Tx-2 the second most recent transaction, and Tx-1 the most recent. The journal 500 thus provides a complete history of the changes made to each document that is represented in the journal 500.

Figure 6:
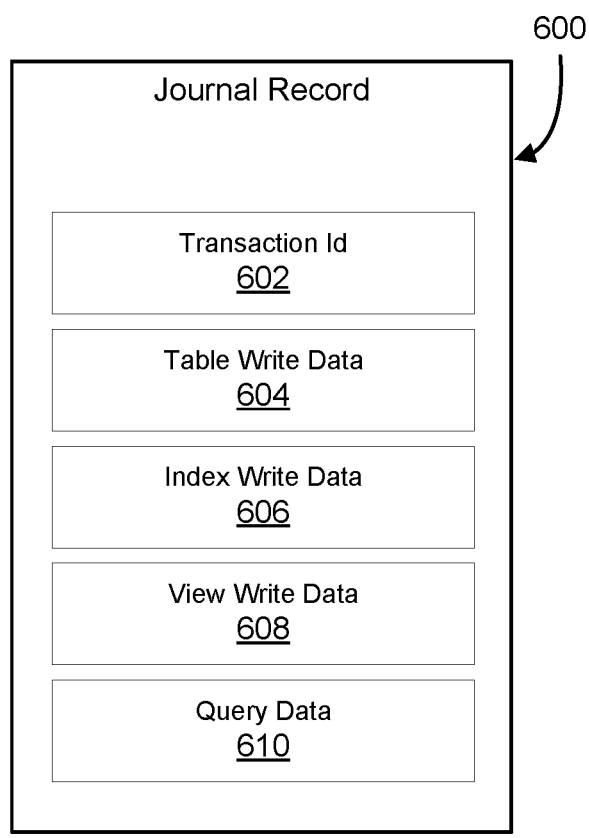
FIG. 6 illustrates aspects of a journal record, in accordance with an embodiment.

FIG. 6 illustrates aspects of a journal record, in accordance with an embodiment. In the example of FIG. 6, a journal record 600 describes various aspects of a transaction. In an embodiment, the journal record might correspond to or be an aspect of one of the transactions Tx-1, Tx-2, ... Tx-N depicted in FIG. 5.

As depicted in FIG. 6, a journal record 600 comprises, in an embodiment, a transaction identifier 602. The transaction identifier 602 may be a sequence number, timestamp, cryptographic hash, and so forth. Note that in some embodiments, cryptographic techniques may be used to safeguard the integrity of the journal record 600 and the journal 500, including safeguards which ensure that the ordering of transactions is preserved. Embodiments may use transaction identifiers 602, or other data included in the journal record, as an aspect of these safeguards.

In an embodiment, the journal record 600 comprises table write data 604. The table write data represents modifications made to a table in the corresponding transaction. For example, the table write data 604 might represent changes made to any documents stored in a table as a result of the transaction.

In an embodiment, the journal record 600 comprises index write data 606. The index write data represents modifications made to an index as a consequence of the corresponding transaction. Likewise, in an embodiment, the journal record 600 comprises view write data 608, which represents modification made to a view as a consequence of the transaction.

In an embodiment, the journal record 600 comprises query data 610, representing a SQL command, query language command, or other command on which the transaction was based. This data may be stored for diagnostic purposes.

As described with reference to FIGS. 5 and 6, a journal record comprises, in various embodiments, references to storage fragments affected by a transaction. FIG. 7 illustrates aspects of a storage technique for summary data which utilizes storage fragments, in accordance with an embodiment.

As depicted in the example 700 of FIG. 7, a number of storage structures 720, 722 store fragments 702-706. Each one of the fragments 702-706 resides on a single one of the storage structures 720, 722. In embodiments, each storage structure resides on a single storage node. A storage node comprises a computing device with at least one processor, a memory, and a storage device such as a flash driver, mechanical disk drive, network attached storage, and so forth.

In various embodiments, a given fragment 702 of a summary is a set of records that are managed by the database system 100 as a unit. The summary is fragmented so that every record in a summary is in exactly one fragment. Each fragment contains only record summaries for any one table, index, or view. For example, a first fragment 702 might comprise data for a table summary 710, a second fragment 704 might comprise an index summary 712, and a third fragment might comprise a view summary 714. In some embodiments, each summary corresponds to exactly one fragment, although in other embodiments a summary may be split across fragments. A fragment is sized so that a large number of records can fit into a single fragment, but is not so large that the time required to do a full scan of the fragment is excessive.

A storage structure, such as any of the depicted storage structures 720, 722, comprises a data structure for storing data. Examples of such structures include, but are not limited to, B-trees, hash buckets, and heap trees. Suitable storage structures provide a scan capability, and may also provide filtering, scan-and-filter, and so forth.

In an embodiment, a given storage structure 720 may store multiple fragments. In other embodiments, a given storage structure 722 stores only a single fragment 706. In some embodiments, a given fragment is replicated to multiple storage structures.

Figure 8:
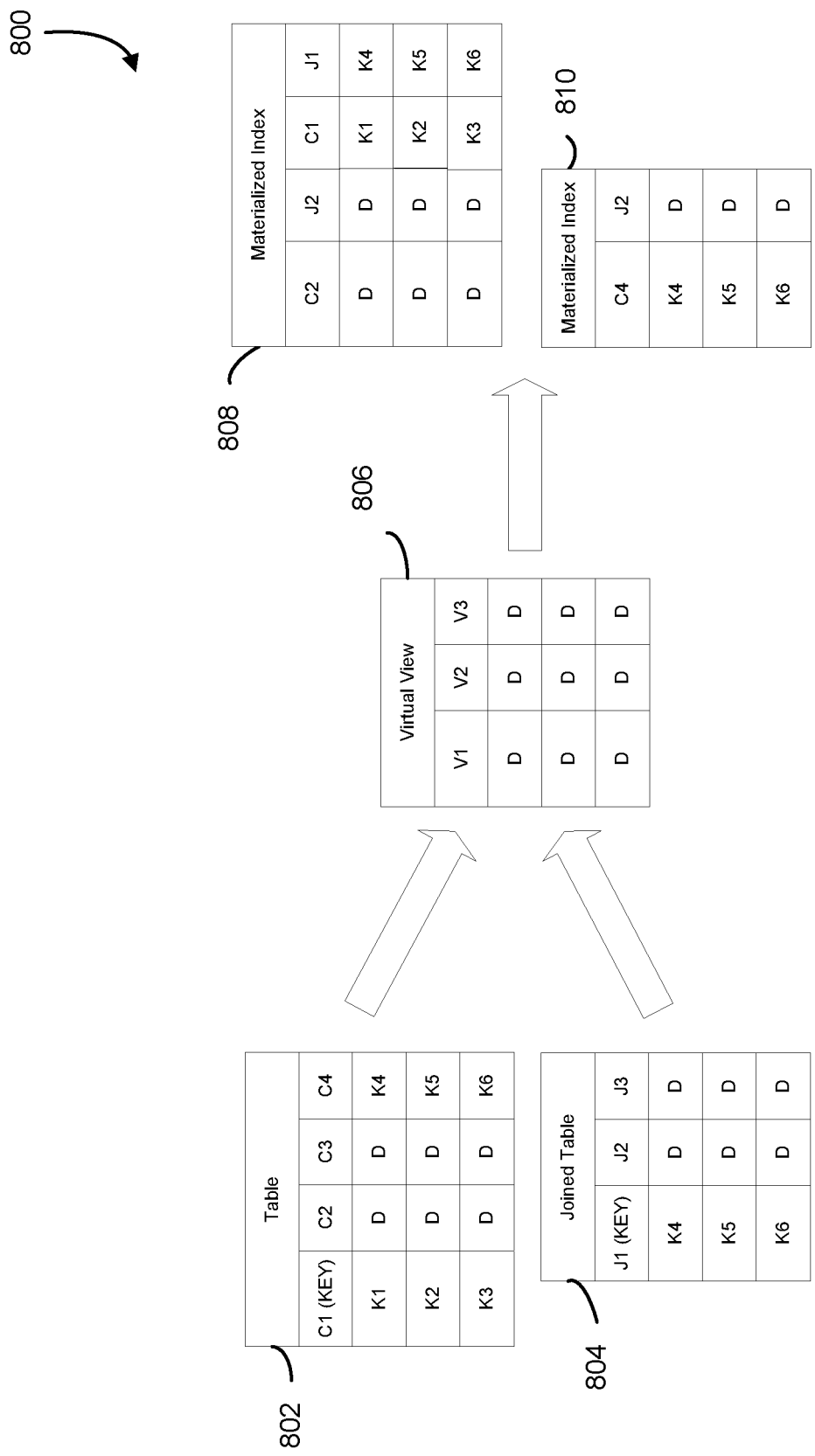
FIG. 8 illustrates aspects of creating indexes for a virtual view of a database table.

FIG. 8 illustrates aspects of creating indexes for a virtual view of a database table. In the example 800 of FIG. 8, it may for illustrative purposes be assumed that there is a virtual view 806 defined as a combination of a two tables, depicted in FIG. 8 as a table 802 and a joined table 804. The virtual view 806 might, for example, be defined as a SQL statement which joins the two tables 802, 804 and projects certain columns from each table into the virtual view 806.

The virtual view 806 is not materialized. In other words, no table or other summary structure which directly corresponds to the virtual view 806 has been created. Instead, the virtual view 806 may be defined in terms of a query language statement or other criteria. When the virtual view 806 is queried, the system translates the query on the virtual view 806 to a query on the underlying table, using the query language statement or other criteria. A query on the view 806 may therefore be thought of as part of a nested query which also comprises the query language statement that makes up the view definition.

At the request of a client, the system is able make adjustments to the performance of queries of the virtual view by requesting the creation of an index on the virtual view. Here, creating an index "on" the virtual view refers to the creation of an index that may be used to adjust the performance of queries directed to the virtual view. Indexes created by the database system in response to such requests do not reference the non-materialized, virtual view, since there is nothing to reference. Instead, the database system creates indexes which refer to materialized data structures, such as the table(s) which underlie the virtual view.

For example, in FIG. 8, the database system may receive a request to adjust the performance of the virtual view 806. The request may be formulated in the same manner as a "CREATE INDEX" command directed to an ordinary table or materialized view. To illustrate, the command might be expressed as a query language statement such as "CREATE INDEX idx ON virt-view (V1, V2)," where virt-view is a virtual view and (V1, V2) are columns defined in the virtual view.

The database system may identify relationships between columns defined in a virtual view and the corresponding table(s) that comprise the virtual view. For example, in FIG. 8, the virtual view 806 might have been defined as a join of two tables 802, 804. It might be the case that virtual view 806 columns V1 and V2 were derived from column C2 of a first table 802, and column V3 was derived from column J2 of the joined table 804. It will be appreciated that these examples are intended to be illustrative of general concepts, and as such should not be construed so as to limit the scope of the present disclosure to only those embodiments which conform to the specific example provided.

In response to a request to create an index on the virtual table, the database system may identify relationships between columns of the virtual view 806 and its corresponding tables 802, 804. Based on these relationships, the database system can define and materialize indexes 808, 810 that are predicted to improve performance in a manner consistent with what would be expected based on the request to create the index. The materialized indexes 808, 810 can be described as indexes on a virtualized view. They may comprise references to the underlying table(s) 802, 804. In particular, a reference to a column of an underlying table may be selected for inclusion in an index of a virtual view based on a column of the virtual view being derivable from a column of the underlying table. The reference to the column can, in various combinations, include copies of the column's data from the underlying data, a link or pointer to the column, links or pointers to locations within the underlying table, and various combinations thereof.

For example, if a request to create and index was as "CREATE INDEX idx ON virt-view (V1)," an index of the virtual view might be created that would be expected to improve the performance of a query on virt-view over the column V1. If the column V1 is derived from a column C2 of an underlying table, then an index comprising the column C2 can be created and used to enhance the performance of queries on virt-view over the column V1. Embodiments may translate the query on view (virt-view in this example) to a query over the underlying table. When executed, the query on the underlying table can leverage the index of the virtual view.

Figure 9:
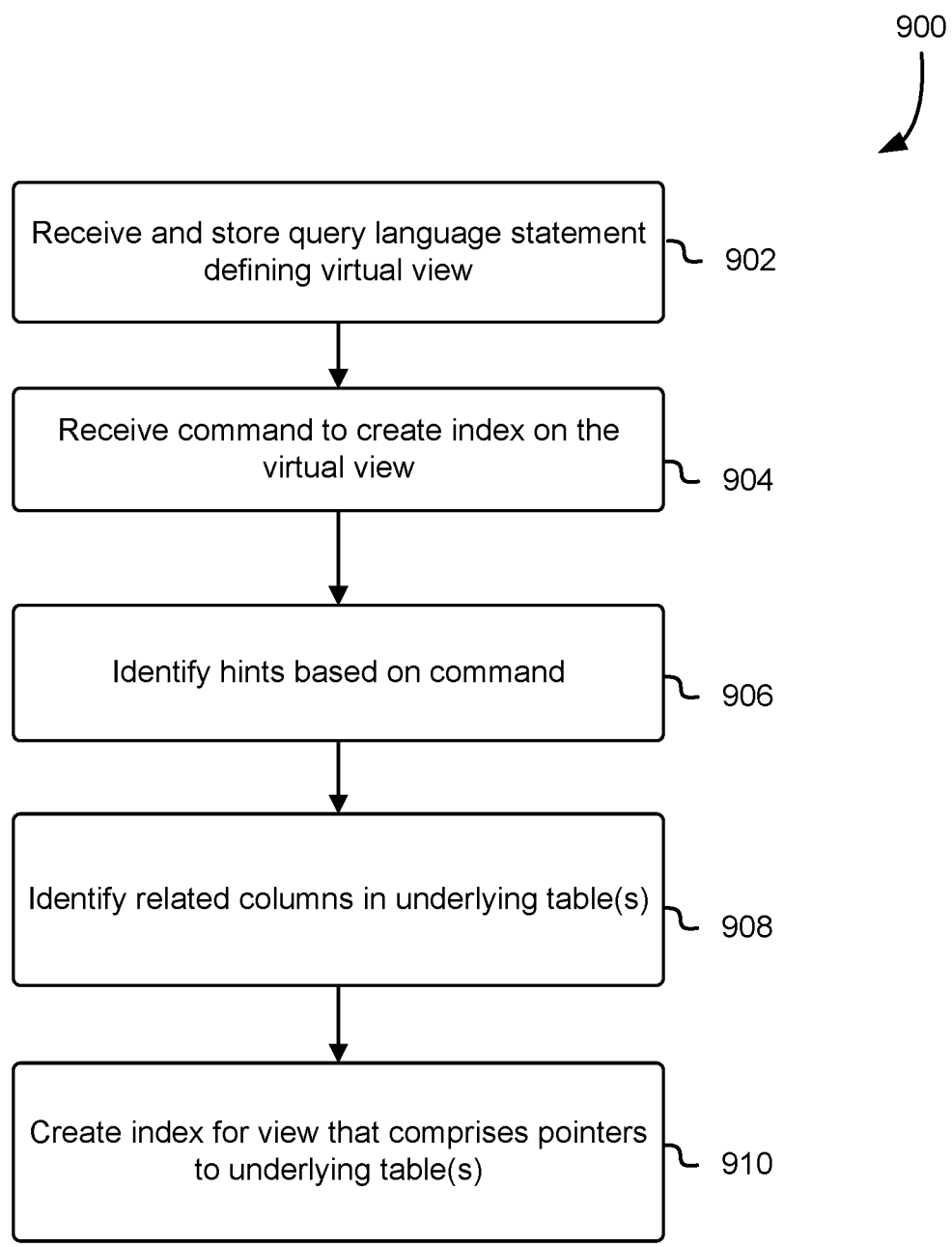
FIG. 9 illustrates aspects of an example process of creating materialized indexes on virtual views.

These aspects may be further understood in view of FIG. 9, which illustrates aspects of an example process of creating materialized indexes on virtual views. Although the example process 900 of FIG. 9 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

Step 902 depicts receiving a storing a query language statement defining a virtual view. The stored query language statement serves as the definition of the virtual view. As noted, a virtual view is one that is not materialized, and as such is one that cannot be directly referenced by an index.

The definition of the virtual view comprises a mapping between elements of the virtual view and elements of the underlying table or tables. Columns might be mapped on a one-to-one basis, might be renamed, might be computed based on inputs from the underlying table, might be the results of joining tables, and so forth.

Step 904 depicts receiving a command to create an index on the virtual view. In embodiments, the command is structured identically to a command to create an index on a materialized view. However, because the virtual view is non-materialized, the system responds to the request by creating an appropriate index on the table or tables underlying the view.

The command to create the index on the virtual view is indicative of columns, sort orders, aggregations, group by operations, and so on. For example, a CREATE VIEW statement might specify that an index be created on a view based on a particular column, or grouped based on a particular column. The query processor may analyze the command to extract hints that can be incorporated into the index on the underlying table. This is depicted in FIG. 9 as step 906.

Step 908 depicts generating a command to create the index of the virtual view. The index of the virtual view, in embodiments, is generated based on the hints obtained by analysis of the command to create the virtual index, as described with respect to steps 904 and 906. In an embodiment, the index of the virtual view has a structure similar to that of an index of an underlying table, but may include references to columns of the virtual view, as well as to columns of the underlying table(s). In an embodiment, the command that is generated is similar or identical to a "CREATE INDEX" command, but directed to the creation of an index of a virtual view, rather than an index of an underlying table. In some embodiments, the index of a virtual view is identical to an index of an underlying table, and the CREATE INDEX command used to create the index is the same as would be used to create an ordinary index on an underlying table.

Step 910 depicts executing the generated command to create the index of the virtual view. The database system transparently executes the command, so that the effect, from a user or client device's perspective, is that a command to create an index on the virtual view completes normally, even though the system is creating an index which does not necessarily correspond directly with the index that was specified. For example, additional column references may have been included in the materialized index of the virtual view. In some embodiments, the result may be that an index on the underlying table is created. In such cases, embodiments may store catalog or schema table entries representing the index on the virtual view. These may contain an indication that an index on a virtual view is also virtual. Embodiments might also allow the corresponding indexes on the underlying tables to be managed via the entry for the virtual index. For example, a command to delete a virtual index might cause the corresponding indexes on the underlying tables to also be deleted. In other embodiments, such as where the index on the virtual view is created as an index object that includes references to one or more underlying tables, the catalog or schema table of the database may include an entry that directly represents the index of the virtual table.

Figure 10:
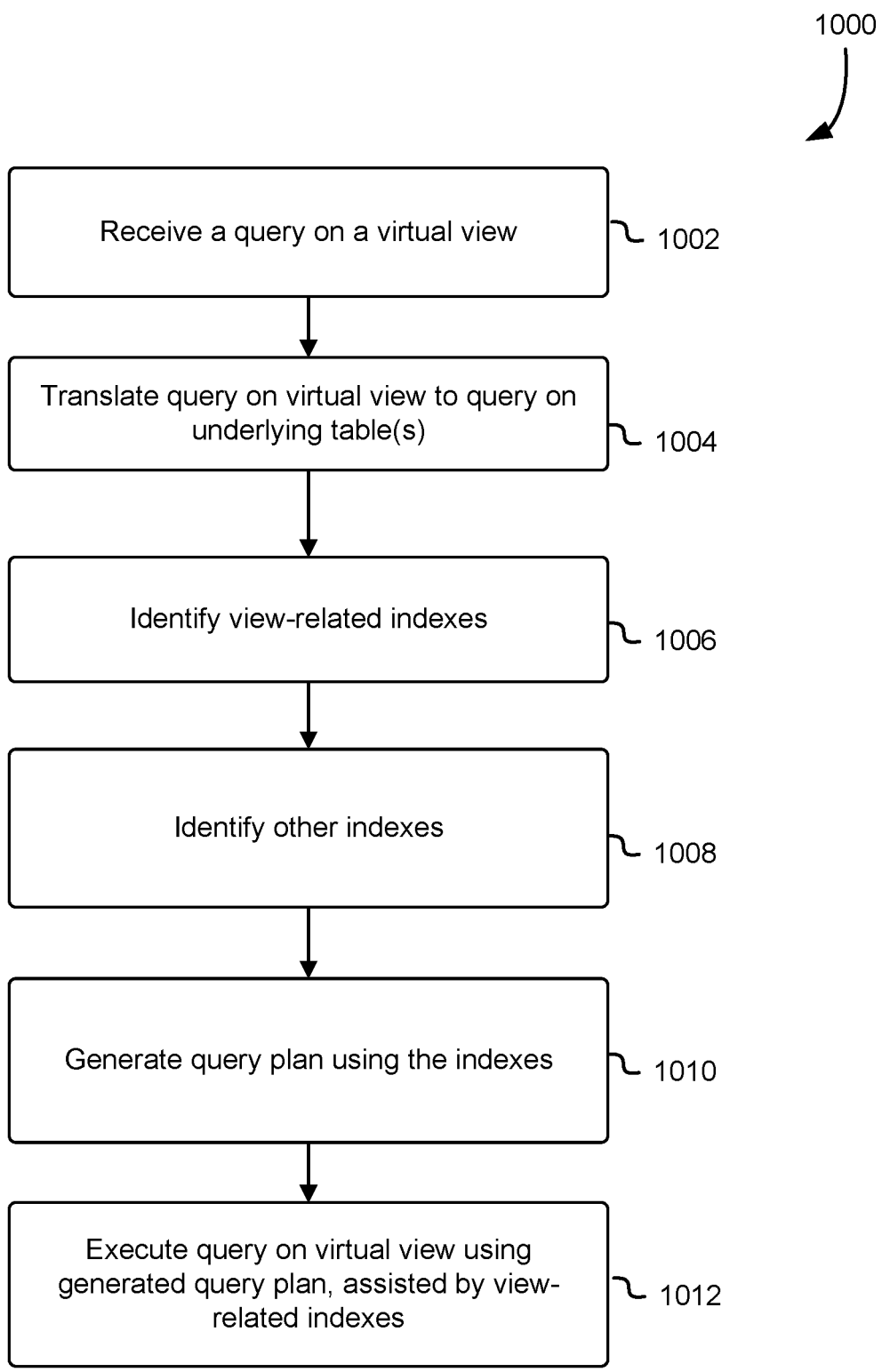
FIG. 10 illustrates aspects of an example process of utilizing materialized indexes on virtual views.

These aspects may be further understood in view of FIG. 10, which illustrates aspects of an example process of utilizing materialized indexes on virtual views. Although the example process 1000 of FIG. 10 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

Step 1002 depicts receiving a query on a virtual view. This may comprise, in cases and embodiments, a query language statement where the "FROM" clause indicates the name of a virtual view.

Step 1004 depicts translating the query on the virtual view to a query on the underlying table(s). A query processor, such as the query processor depicted in FIG. 1, may translate the query by, for example, replacing the "FROM" clause of the original query with a sub-query based on the view definition.

Step 1006 depicts identifying view-related indexes, and step 1008 depicts identifying other indexes that are applicable to the table. Here, a view-related index refers to an index created in response to a request to index a virtual view. In cases and embodiments, the view-related index is an index on a virtual view that comprises references to underlying table(s). In cases and embodiments, the "view-related" indexes are structurally similar to those created directly on the table, though they might cover different columns.

Step 1010 depicts generating a query plan using the view-related indexes. A query planner, such as the one depicted in FIG. 1, may identify a plan of execution for the query on the virtual view, leveraging one or more of the view-related indexes. In cases and embodiments, indexes created to assist the execution of virtual views may be favored in the generation of the query plan. For example, the creation of a view-related index to assist a query on a virtual view might be treated as a hint that the use of the view-related index would be advantageous. Accordingly, embodiments may assign a weighting to view-related indexes when generating the query plan.

Step 1012 depicts executing the query on the virtual view using the generated query plan, assisted by the view-related indexes. The use of the view-related index, in cases and embodiments, adjusts the performance of the virtual view query, and may typically improve the performance of such queries.

Figure 11:
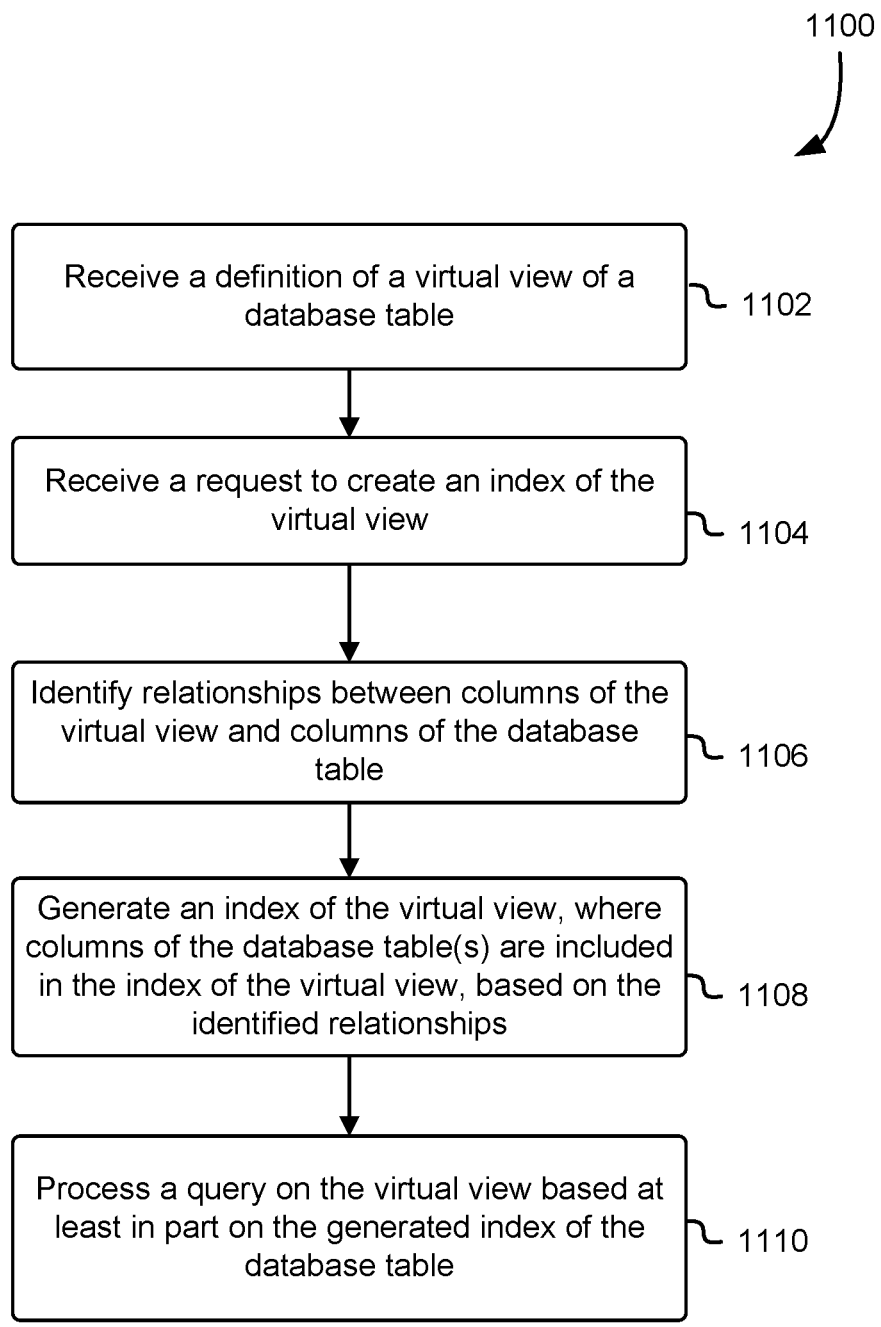
FIG. 11 illustrates an example process of generating and utilizing materialized indexes on virtual views.

FIG. 11 illustrates an example process of generating and utilizing materialized indexes on virtual views. Although FIG. 11 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

Step 1102 depicts receiving a definition of a virtual view of a database table. As suggested above with respect to FIG. 9, the definition of a virtual view may comprise a query language statement indicative of the contents and structure of the virtual view. The command may comprise an indication that the view is not to be materialized, or in other words an indication that the view is a virtual view. The query received in step 1102 may be received, in embodiments, by a query processor.

Step 1104 depicts receiving a request to create an index on the virtual view. The request may be received, in embodiments, by the query processor. In embodiments, the request has a form that is identical to a request to create an index on a materialized view.

Step 1106 depicts identifying relationships between columns of the virtual view and columns of the database table. This comprises determining which columns of the requested virtual view index map to which columns of an underlying table. Typically, each column represented in the requested index is mapped to a corresponding column in the underlying table. A column in the requested index can be said to be derivable from an associated column in the underlying table. For example, a "CustomerID" column referenced in the requested index might be derivable from to corresponding "CustomerID" column in the underlying table. Similarly, a "TotalSales" columns in the requested index might be derivable from a "Sales" column in the underlying table, via an aggregating function.

Step 1108 depicts generating an index of the virtual view, where columns are included in the index based on the identified relationships. The columns included may therefore comprise those from which the columns of the requested index of the virtual view are derived. As explained above regarding FIG. 9, the index on the underlying database table may be generated by executing on a query language command (or a data definition language command, which may be considered an aspect of a query language). As explained with respect to FIG. 9, the command may be generated based on the hints identified in the original request, including the column relationships just mentioned, as well as other features of the originally requested index, such as sort order, aggregations, group-by clauses, and so forth. Execution of this command generates the index of the virtual view. The database system, in embodiments, is adapted to adapt processing of a command to create an index in order to perform specialized processing, such as including in the index columns or other pre-computed data pertaining to the virtual view, to include references to columns in the underlying table(s), and so forth.

Step 1110 depicts processing a query on the virtual view based at least in part on the generated index. This step is explained further regarding FIG. 10. In general, this step involves translating the query on the virtual view to a query on the underlying table(s), identifying relevant indexes (including and in some cases giving preference to indexes on the virtual view), and generating a query plan using the relevant indexes.

Figure 12:
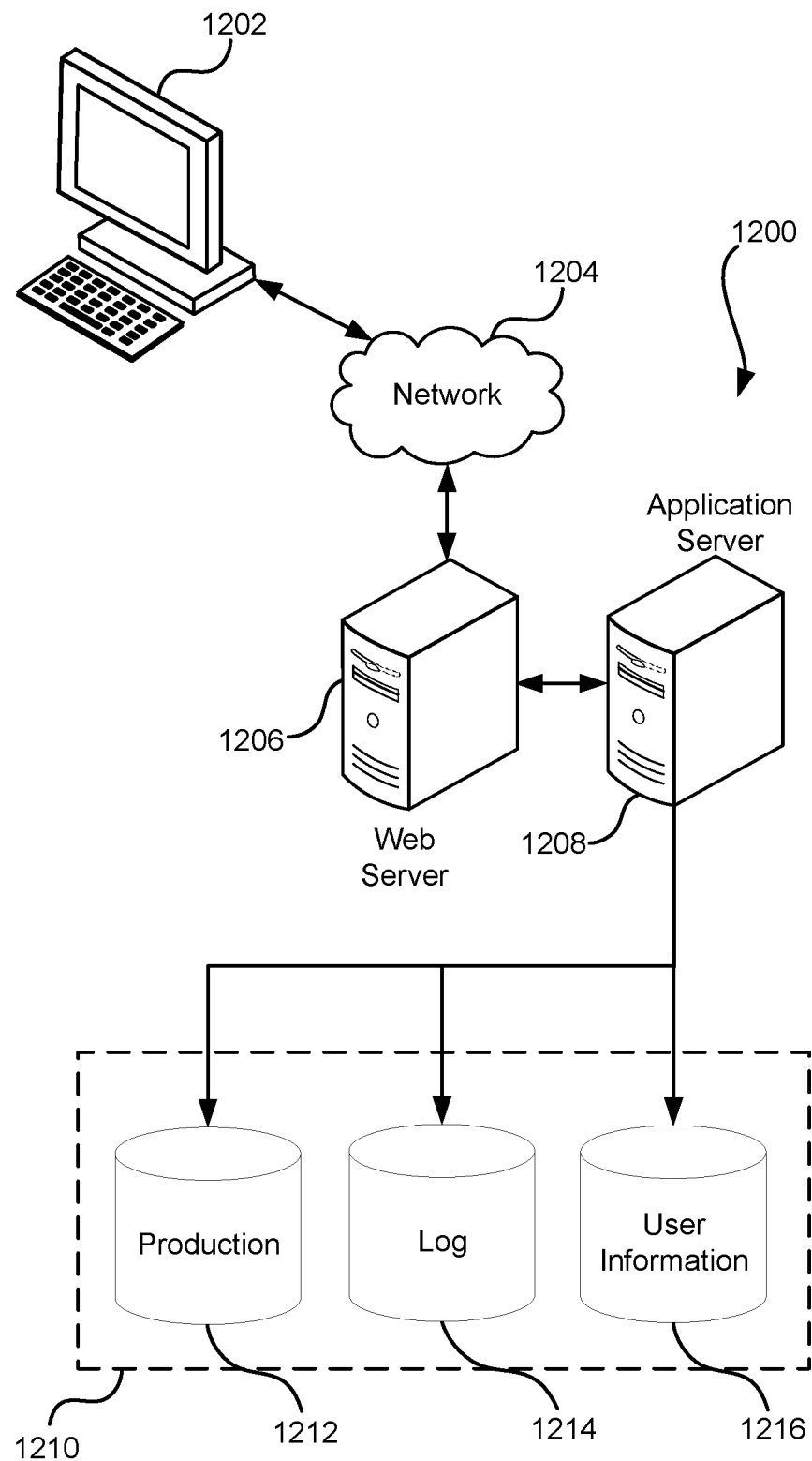
FIG. 12 illustrates a system in which various embodiments can be implemented.

FIG. 12 illustrates aspects of an example system 1200 for implementing aspects in accordance with an embodiment. As will be appreciated, although a web-based system is used for purposes of explanation, different systems may be used, as appropriate, to implement various embodiments. In an embodiment, the system includes an electronic client device 1202, which includes any appropriate device operable to send and/or receive requests, messages, or information over an appropriate network 1204 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1206 for receiving requests and serving content in response thereto, although for other networks an alternative device serving a similar purpose could be used as would be apparent to one of ordinary skill in the art.

In an embodiment, the illustrative system includes at least one application server 1208 and a data store 1210, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1202 and the application server 1208, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1210, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1212 and user information 1216, which are used to serve content for the production side. The data store also is shown to include a mechanism for storing log data 1214, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1210.

The data store 1210, in an embodiment, is operable, through logic associated therewith, to receive instructions from the application server 1208 and obtain, update or otherwise process data in response thereto, and the application server 1208 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1202. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 1200 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1200, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 11. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   at least one memory comprising computer-executable instructions that, in response to being executed by the at least one processor, cause the system to at least:
   receive a request to create an index of a virtual view of a database table;
   identify a relationship between a column of the virtual view and a column of the database table;
   generate an index of the virtual view, the index of the virtual view comprising a reference to a column of the database table, wherein the reference to the column of the database table is selected for inclusion in the index of the virtual view based at least in part on the identified relationship; and
   process a query on the virtual view based at least in part on the generated index of the virtual view.

2. The system of claim 1, wherein the virtual view is defined by a query language statement.

3. The system of claim 1, wherein the at least one memory comprises further executable instructions that, in response to being executed by the at least one processor, cause the system to at least:
   include the reference to the column of the database table in the index of the virtual view, based at least in part on a determination that the column of the virtual view can be derived from the column of the database table.

4. The system of claim 1, wherein the relationship is identified based at least in part on an analysis of a query language statement associated with the definition of the virtual view.

5. The system of claim 1, the at least one memory comprises further executable instructions that, in response to being executed by the at least one processor, cause the system to at least:
   identify one or more indexes created for use with queries on the virtual view; and
   generate a query plan for processing the query, based at least in part on the identified one or more indexes.

6. A computer-implemented method, comprising:
   receiving a request to adjust performance of a virtual view of a database table;
   determining that a column of the virtual view is related to a column of the database table;
   generating an index of the virtual view, the index of the virtual view comprising a reference to the column of the database table, the reference to the column of the database table included in the index of the virtual view based at least in part on the column of the virtual view being related to the column of the database table; and
   generating results of a query on the virtual view, the results generated based at least in part on the index of the virtual view.

7. The computer-implemented method of claim 6, wherein the virtual view is defined by a query language statement.

8. The computer-implemented method of claim 7, further comprising:

determining that the column of the virtual view can be derived from the column of the database table, based at least in part on analyzing the query language statement.

9. The computer-implemented method of claim 7, further comprising:
selecting the column of the database table for inclusion in the index of the virtual view, based at least in part on analyzing the query language statement.

10. The computer-implemented method of claim 6, further comprising:
identifying one or more indexes created for use with queries of the virtual view; and
generating a query plan for processing the query, based at least in part on the identified one or more indexes.

11. The computer-implemented method of claim 10, further comprising:
generating the query plan based at least in part on a prioritization of indexes generated in response to the request to adjust performance of the virtual view.

12. The computer-implemented method of claim 6, wherein the index of the virtual view is stored in a summary portion of a ledger.

13. The computer-implemented method of claim 6, wherein the virtual view is associated with a journal table.

14. A non-transitory computer-readable storage medium having stored thereon executable instructions that, as a result of being executed by one or more processors of a computer system, cause the computer system to at least:
receive a request to create an index for a virtual view of a database table;
determine that a column of the virtual view is related to a column of the database table;
generate an index of the virtual view, the index of the virtual view comprising a reference to the column of the database table, the reference to the column of the database table included in the index of the virtual view based at least in part on the column of the virtual view being related to the column of the database table; and
generate results of a query on the virtual view, the results generated based at least in part on the generated index of the database table.

15. The non-transitory computer-readable storage medium of claim 14, wherein the virtual view is defined by a query language statement.

16. The non-transitory computer-readable storage medium of claim 15, wherein the instructions further comprise instructions that, as a result of being executed by the one or more processors, cause the computer system to at least:
determine that the column of the virtual view can be derived from the column of the database table, based at least in part on analyzing the query language statement.

17. The non-transitory computer-readable storage medium of claim 14, wherein the instructions further comprise instructions that, as a result of being executed by the one or more processors, cause the computer system to at least:
select the column of the database table for inclusion in the index of the virtual view, based at least in part on analyzing the query language statement.

18. The non-transitory computer-readable storage medium of claim 14, wherein the instructions further comprise instructions that, as a result of being executed by the one or more processors, cause the computer system to at least:
identify one or more indexes created for use with queries of the virtual view; and
generate a query plan for processing the query, based at least in part on the identified one or more indexes.

19. The non-transitory computer-readable storage medium of claim 14, wherein the index of the database table is stored in a summary portion of a ledger.

20. The non-transitory computer-readable storage medium of claim 14, wherein the virtual view is associated with a journal table.

\* \* \* \* \*